(12) United States Patent
Barraclough et al.

(10) Patent No.: US 8,345,615 B2
(45) Date of Patent: Jan. 1, 2013

(54) OMITTING UE ID ON AN ENHANCED RACH PROCESS

(75) Inventors: Kristan Barraclough, Southampton (GB); Juho Pirskanen, Tampere (FI); Burghard Unteregger, Vienna (AT)

(73) Assignee: Nokia Siemens Networks Oy, Espoo (FI)

( * ) Notice: Subject to any disclaimer, the term of this patent is extended or adjusted under 35 U.S.C. 154(b) by 234 days.

(21) Appl. No.: 12/733,889

(22) PCT Filed: Sep. 23, 2008

(86) PCT No.: PCT/EP2008/062697
§ 371 (c)(1),
(2), (4) Date: Aug. 10, 2010

(87) PCT Pub. No.: WO2009/040346
PCT Pub. Date: Apr. 2, 2009

(65) Prior Publication Data
US 2010/0296464 A1  Nov. 25, 2010

(30) Foreign Application Priority Data
Sep. 25, 2007  (EP) .................................... 07018855

(51) Int. Cl.
H04W 4/00 (2009.01)
H04J 3/00 (2006.01)
H04J 1/00 (2006.01)
H04B 7/208 (2006.01)
H04B 7/212 (2006.01)

(52) U.S. Cl. ........ 370/329; 370/337; 370/343; 370/344; 370/347; 370/442

(58) Field of Classification Search ................. 370/328, 370/329, 336, 337, 343–345, 347, 342
See application file for complete search history.

(56) References Cited

U.S. PATENT DOCUMENTS

| 2002/0041578 | A1* | 4/2002 | Kim et al. ..................... 370/335 |
| 2006/0215625 | A1* | 9/2006 | Hempel et al. ................ 370/342 |
| 2007/0060149 | A1 | 3/2007 | Lim |
| 2007/0081513 | A1 | 4/2007 | Torsner |
| 2007/0165526 | A1 | 7/2007 | Lee |

FOREIGN PATENT DOCUMENTS

| WO | WO 9633586 | 10/1996 |
| WO | 2007/077250 A2 | 7/2007 |

OTHER PUBLICATIONS

"Universal Mobile Telecommunications System (UMTS); Medium Access Control (MAC) protocol specification (3GPP TS 25.321 version 7.0.0 Release 7); ETSI TS 125 321" ETSI Standards, European Telecommunications Standards Institute, Sophia-Antipo, FR, vol. 3-R2, No. V700, Mar. 2006, XP014034285 ISSN: 0000-0001 Section 9.2.1.1 p. 39, line 34-p. 40, line 1; figure 9.2.1.1.1.
Universal Mobile Telecommunications System (UMTS); Radio Resource Control specification (3GPP TS 7.0.0 Release 7); ETSI TS European Standards Institute, (RRC) protocol 25.331 version 125 331 ETSI Standards, Telecommunications Sophia-Antipo, FR, vol. 3-R2, No. V700, Mar. 2006, pp. 438-633, XP014034302 ISSN: 0000-0001 p. 439, line 21-line 24 p. 632, line 1-line 24.

* cited by examiner

*Primary Examiner* — Ronald Abelson
(74) *Attorney, Agent, or Firm* — Staas & Halsey LLP

(57) ABSTRACT

A method of an uplink transfer at the UE side in a wireless communications system over a wireless interface between a radio network and a user equipment node uses a first mode of transfer and a second mode of transfer. The first mode of transfer involves sending a first message by the UE to a Node B of the wireless communication system. The second mode of transfer involves receiving a resource by the UE from the Node B, and sending at least one subsequent message by the UE to the Node B, the at least one subsequent message omits an UE id.

18 Claims, 8 Drawing Sheets

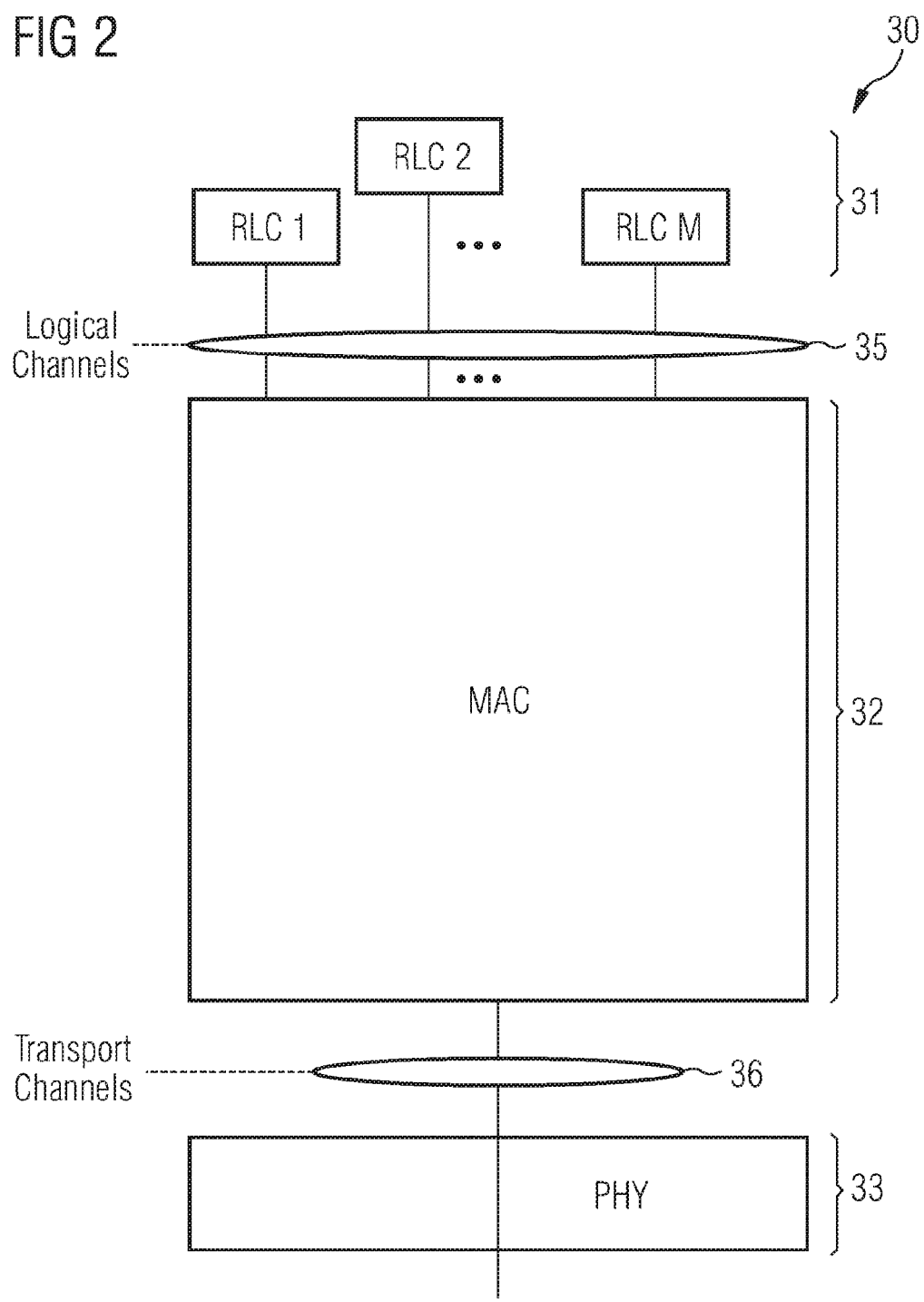

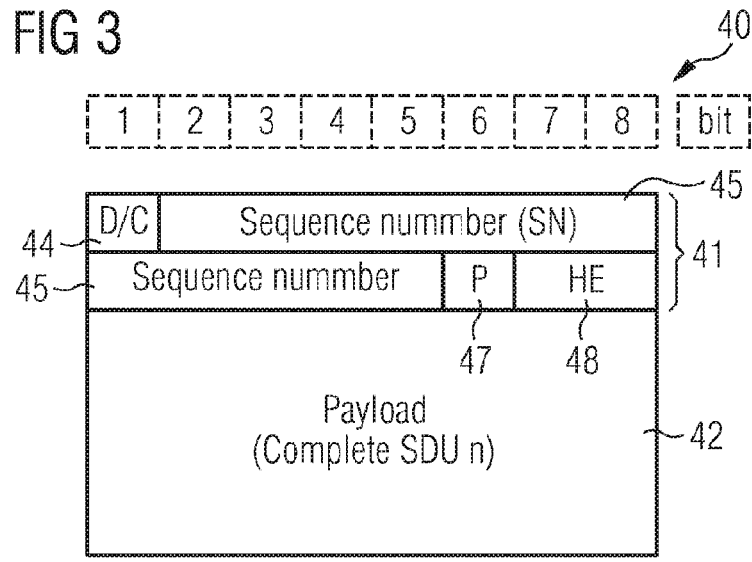
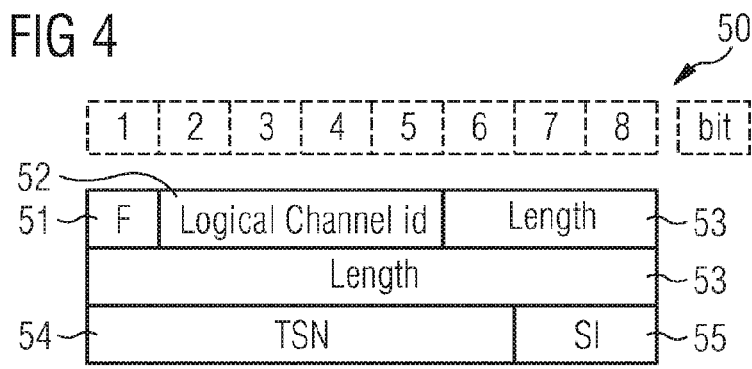
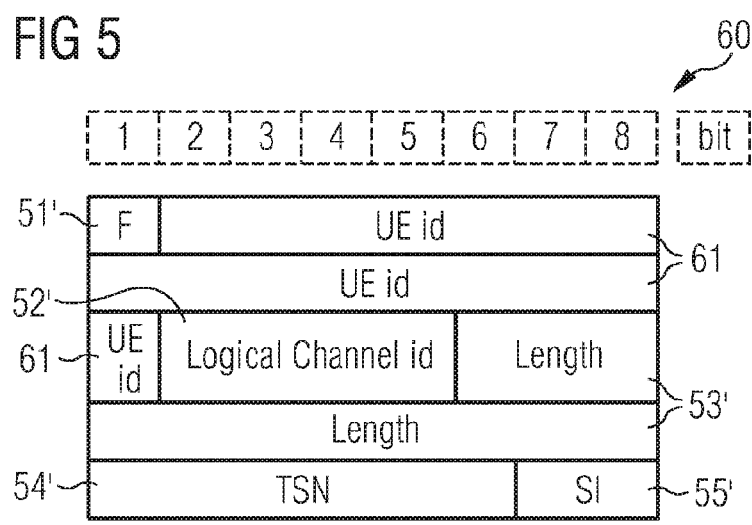

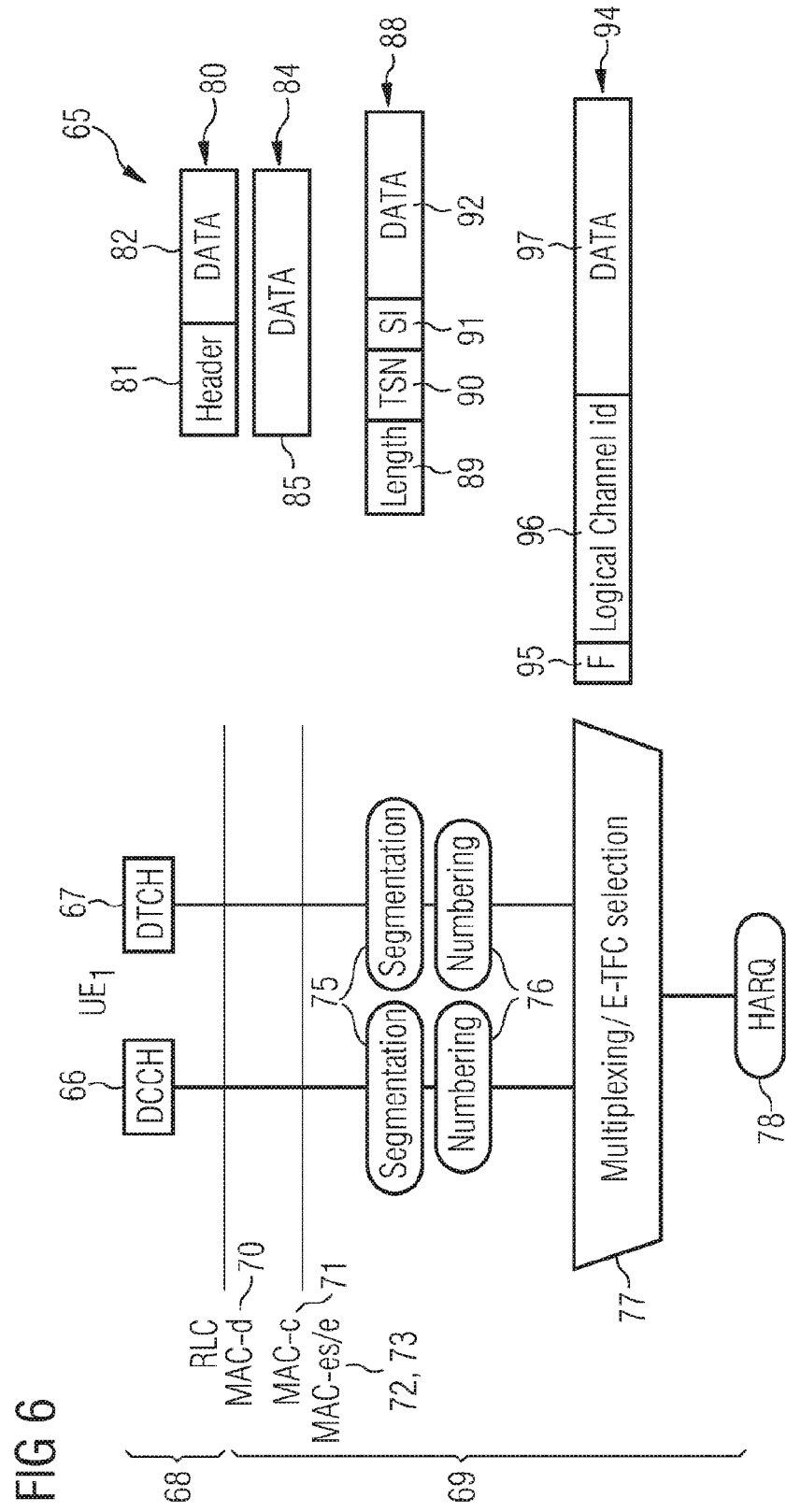

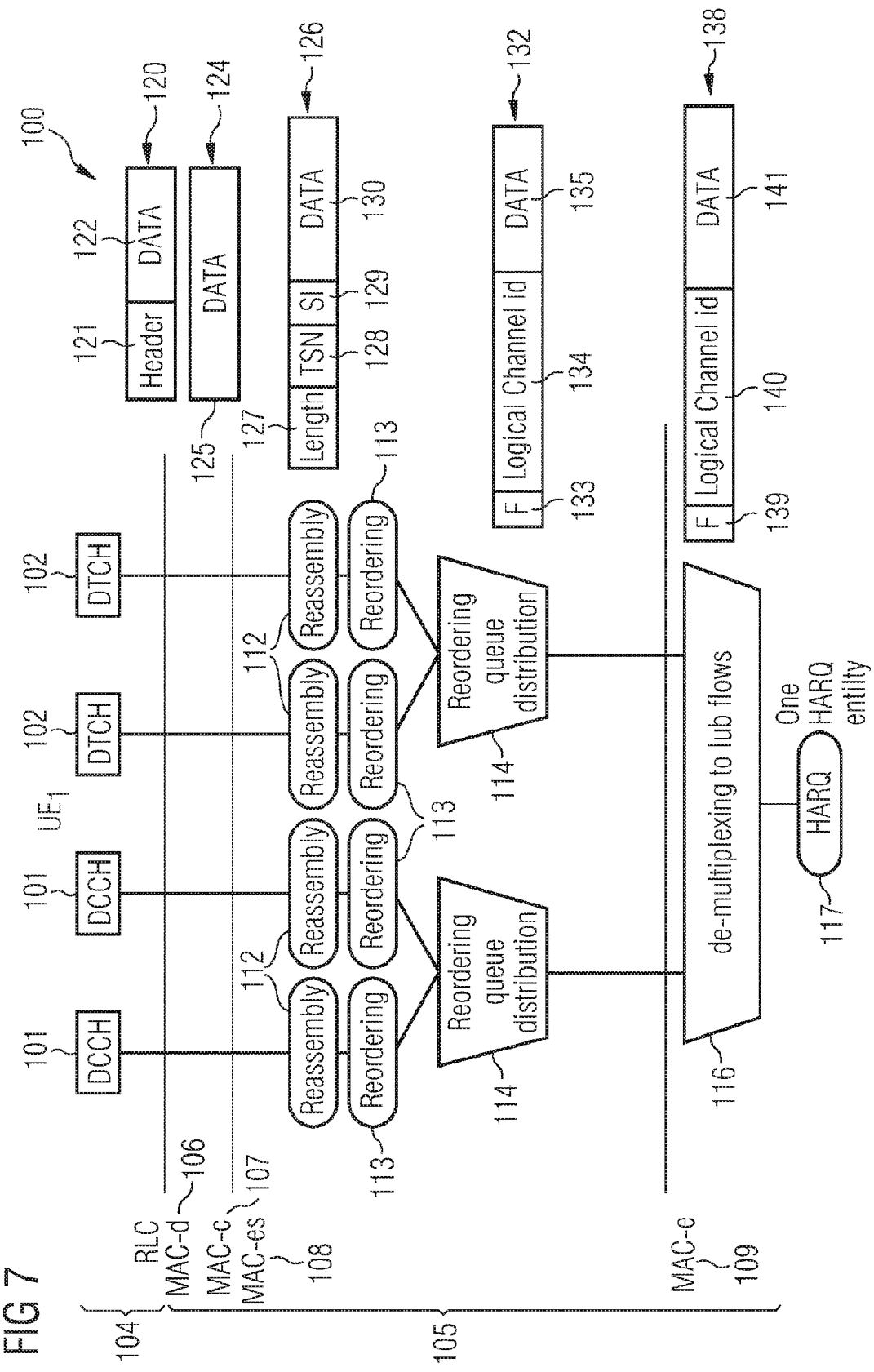

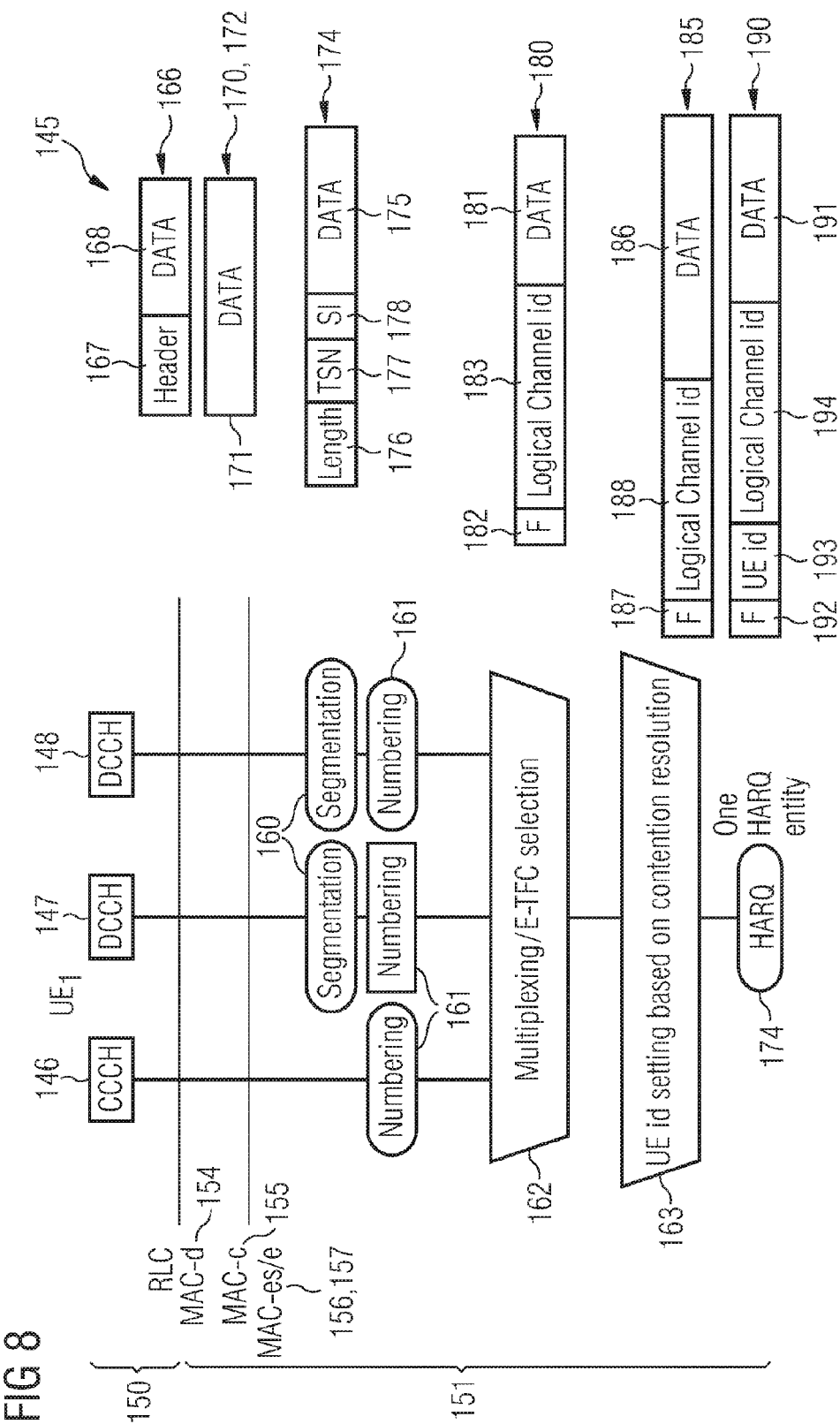

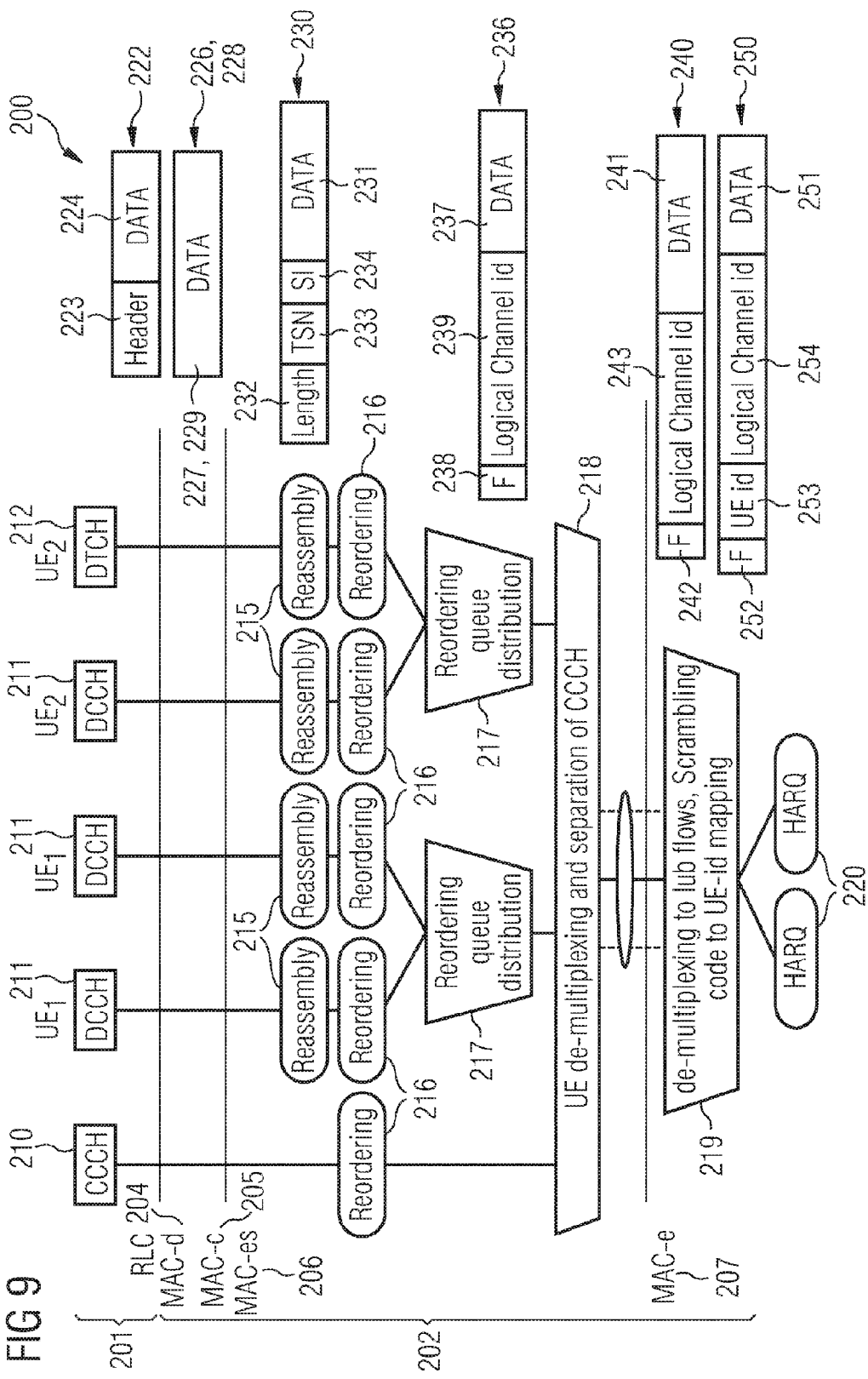

OMITTING UE ID ON AN ENHANCED RACH PROCESS

CROSS REFERENCE TO RELATED APPLICATIONS

This application is based on and hereby claims priority to PCT Application No. PCT/EP2008/062697 filed on Sep. 23, 2008 and EP Application No. EP07018855 filed on Sep. 25, 2007, the contents of which are hereby incorporated by reference.

BACKGROUND

This invention relates to an improved mobile radio telecommunication network.

A Universal Mobile Telecommunications System (UMTS) is a third generation mobile communication system, which evolved from a Global System for Mobile Communications (GSM), and is intended to provide improved mobile communication services based on a GSM core network (CN) and Wideband Code Division Multiple Access (WCDMA) access technology.

US 20070081513 discloses a wireless data flow between a radio network node and a user equipment node. A medium access control (MAC) layer located in the radio network node determines a priority of data unit relative to other data units associated with the one data flow.

US 20070165526 discloses a method to enable a medium access control (MAC) to reduce and to increase packet size and the data transmit rate by working with an upper layer controller to maximize data transfer rate, transmitter power, and to minimize packet drop rate.

SUMMARY

It is one potential object to provide an improved mobile radio telecommunication network.

The inventors propose an improved mobile radio telecommunication network that uses a method an uplink transfer in a wireless communications system over a wireless interface between a radio network and a user equipment node (UE), at the UE side. The method comprises a first mode of transfer and a second mode of transfer.

The first mode of transfer comprises the step of sending a first message by the UE to a Node B of the wireless communication system. The second mode of transfer comprises the step of receiving a resource by the UE from the Node B, and sending at least one subsequent message by the UE to the Node B, the at least one subsequent message omits an UE id.

The first message may comprise an UE id. The resource can comprise a dedicated scrambling code. The at least one subsequent message can be scrambled with the dedicated scrambling code.

A MAC layer of the UE side can comprise a MAC-d sub-layer, a MAC-c sub-layer, and a MAC-es sub-layer with the MAC-c sub-layer being provided between the MAC-d sub-layer and the MAC-es sub-layer. The first message can comprise an UE id in a MAC header of a MAC layer. The at least one subsequent message can omit the UE id in a MAC layer. The first message can comprise a UE id status field, which stores a presence status of the UE id.

The inventors also propose a method for uplink transfer in a wireless communications system over a wireless interface between a radio network and a user equipment node (UE), at the radio network side. This method uses a first mode of transfer and a second mode of transfer.

The first mode of transfer comprises the step of receiving a first message by a Node B of the wireless communication system from the UE, and assigning a resource to the UE by the Node B. The second mode of transfer comprises the step of receiving at least one subsequent message from the UE, which omits an UE id.

The first message can comprise an UE id. The resource can comprise a dedicated scrambling code.

The first mode of transfer can further comprise the step of mapping the dedicated scrambling code to the UE id by the Node B or other parts of an UTRAN (UMTS terrestrial radio access network) of the wireless communications system. The at least one subsequent message can be scrambled with the dedicated scrambling code.

The first mode of transfer can comprise the further step of determining the UE id status of the first message from an UE id status field of the first message.

The second mode of transfer can further comprise the step of determining the UE id from the mapping of the dedicated scrambling code to the UE id.

A MAC layer of the radio network side can comprise a MAC-d sub-layer, a MAC-c sub-layer, and a MAC-es sub-layer with the MAC-c sub-layer being provided between the MAC-d sub-layer and the MAC-es sub-layer.

The inventors further propose a user equipment (UE) of a wireless communications system in an uplink transfer over a wireless interface between a radio network and the user equipment (UE) node. The user equipment has a medium access control (MAC) layer at the UE side. The UE is operative in a first mode of transfer and a second mode of transfer.

The UE is for transmitting a first message to a Node B of the wireless communications system in a first mode of transfer. The UE is for transmitting at least one subsequent message to the Node B, which omits an UE id after being assigned a resource by the Node B.

The resource can comprise a dedicated scrambling code. The at least one subsequent message can be scrambled with a dedicated scrambling code in a second mode of transfer.

The medium access control (MAC) layer can comprises a MAC-d sub-layer, a MAC-c sub-layer, and a MAC-es sub-layer with the MAC-c sub-layer being provided between the MAC-d sub-layer and the MAC-es sub-layer.

The first message can comprise an UE id. The first message can further comprise a UE id status field, which stores a presence status of the UE id.

The inventors still further propose a Node B of a radio network of a wireless communications system in an uplink over a wireless interface between the radio network and a user equipment node (UE).

The Node B is operative in a first mode of transfer and a second mode of transfer. The Node B is for receiving a first message, and is for assigning a resource to the UE in the first mode of transfer. The Node B is also for receiving at least one subsequent message in the second mode of transfer, the at least one subsequent message omits an UE ID.

The resource can comprise a dedicated scrambling code. The Node B can be for mapping the dedicated scrambling code to the UE id. The at least one subsequent message can be scrambled with the dedicated scrambling code.

The Node B can be for determining the UE id by mapping the dedicated scrambling code to the UE id, in the second mode of transfer. The first message can comprise an UE id status field.

The Node B can comprise a medium access control (MAC) layer, which comprises a MAC-d sub-layer, a MAC-c sub-layer, and a MAC-es sub-layer with the MAC-c sub-layer being provided between the MAC-d sub-layer and the MAC-es sub-layer.

The application can advantageously reduce protocol overhead and saves radio resources as the UE ID is omitted from every TTI transmission to the Node B. The protocol overhead reduction may ranges from two to four octets. Moreover, data transmitted with dedicated scrambling codes avoids collisions between the transmitted data. A packet data unit (PDU) can also be mapped to its correct UE by a RNC (radio network controller) even though there is no dedicated connection between the Node B and the RNC. A HARQ retransmissions can continue in the event of a transition to a CELL_DCH state as the PDU structure of the UE is identical to its PDU structure in the CELL_DCH state.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 illustrates a protocol layer structure 30 of the UMTS system 10 of FIG. 1, FIG. 3 illustrates AM (acknowledge mode) RLC (radio link control) PDU (protocol data unit) 40, which is transmitted by the RLC layer 31 of FIG. 2, FIG. 4 illustrates a first MAC-e header 50 of a PDU, or a MAC-es header 50 of a PDU, for the uplink transport channels of FIG. 2, FIG. 5 illustrates a second MAC-e header 60 of a PDU, or a MAC-es header 60 of a PDU, for the uplink transport channels of FIG. 2, FIG. 6 illustrates a simplified protocol architecture 65 for E-DCH (enhanced dedicated channel) in the side of a UE, FIG. 7 illustrates a simplified protocol architecture for E-DCH in the side of a UTRAN, FIG. 8 illustrates a simplified protocol architecture 65 for E-RACH (enhanced random access channel) in the side of a UE, FIG. 9 illustrates a simplified protocol architecture 200 for E-RACH in the side of a UTRAN.

DETAILED DESCRIPTION OF THE PREFERRED EMBODIMENT

Figure 1:
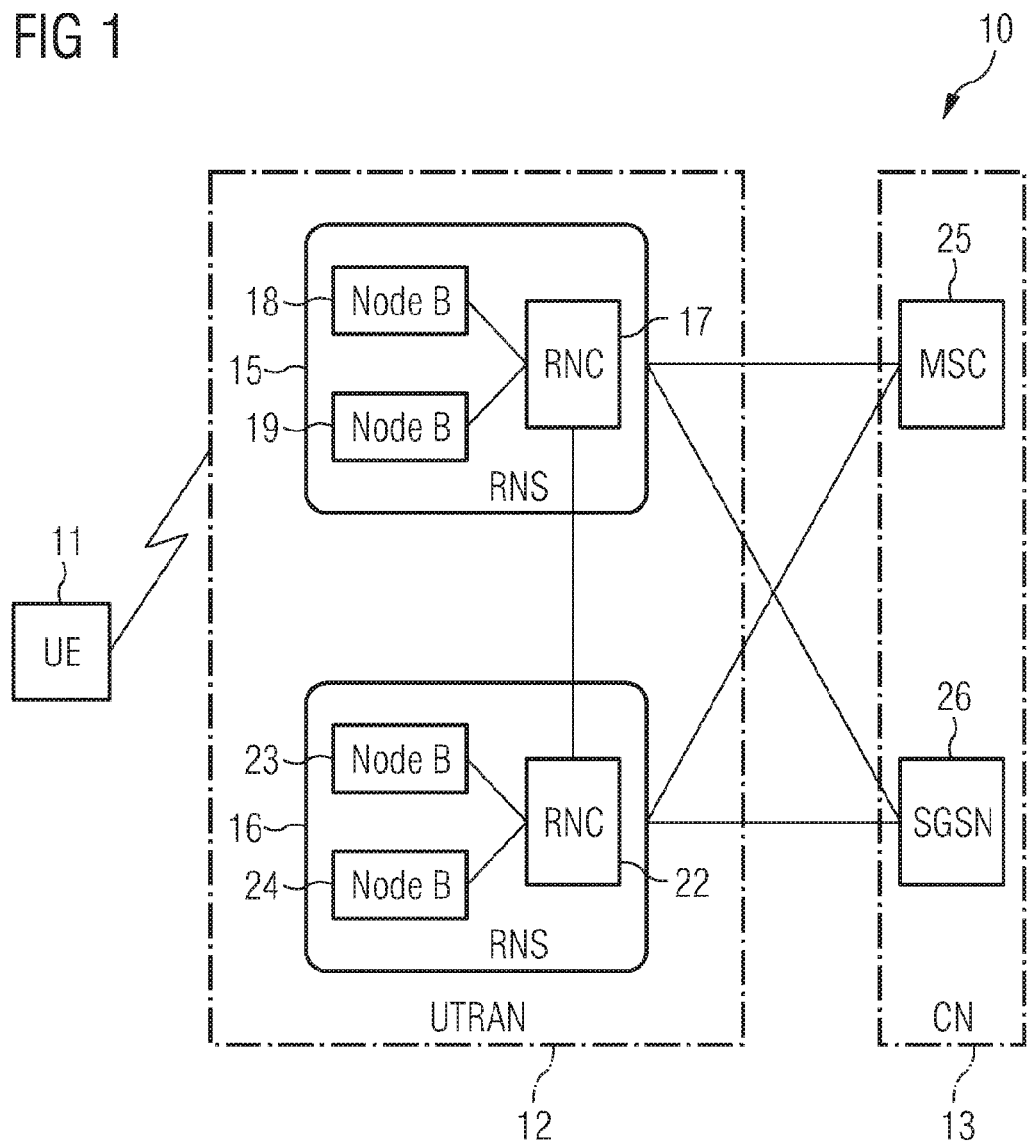
FIG. 1 illustrates in block format a UMTS (Universal Mobile Telecommunications System) type system.

Reference will now be made in detail to the preferred embodiments of the present invention, examples of which are illustrated in the accompanying drawings, wherein like reference numerals refer to like elements throughout.

According to one basic thought of the application, an identifier (ID) of a UE (user equipment) can be omitted in a transmission between the UE and a Node B of telecommunication network, once the UE is assigned with a resource by the Node B. The resource can be a dedicated scrambling code. The UE transmits data scrambled with the dedicated scrambling code and the Node B associates the UE identifier to the dedicated scrambling code.

A method of transmitting data between an UE and a Node B wherein an UE identifier can be omitted is shown below. The transmission can be over an E-RACH or a RACH (random access channel) process. A message with the UE identifier is first transmitted from the UE to the Node B. A header, especially a MAC header, of the message includes a field to indicate the presence of the UE identifier in the message. The UE identifier can be 16 bits wide. The Node B can use the UE ID to identify the UE and to resolve contention.

The Node B later receives the message with the UE identifier and afterward assigns a dedicated scrambling code to the UE. The UE can later transmit subsequent messages without the UE identifier to the Node B. The subsequent transmitted messages are scrambled with the dedicated scrambling code. The flag in the header of the subsequent messages can also indicate the absence of the UE identifier in the message. The Node B then associates or maps the dedicated scrambling code to the UE.

The Node B afterward identities the UE and resolves contention using the dedicated scrambling code, instead of using the UE identifier. The Node B uses the dedicated scrambling code to identify the UE until the UE performs a cell or UTRAN Registration Area (URA) update procedure due to cell reselection or if the UE is performing a Radio Resource Control (RRC) Connection request procedure).

FIG. 1 illustrates in block format a UMTS (Universal Mobile Telecommunications System) type system. A description of the UMTS is disclosed in "3rd Generation Partnership Project (3GPP)", http://www.3gpp.org/.

FIG. 1 shows a UMTS 10, which comprises a plurality of UEs (user equipments) 11, UTRAN (UMTS terrestrial radio access network) 12, and a CN (core network) 13. The UEs 11 are connected to the UTRAN 12 by a radio connection whilst the UTRAN 13 is connected to the CN 13.

The UTRAN 12 includes RNSs (radio network sub-systems) 15 and 16. The RNS 15 includes a RNC (Radio Network Controller) 17 and Node Bs 18 and 19. The Node Bs 18 and 19 are joined to the RNC 17. Similarly, the RNS 16 includes a RNC 22 and Node Bs 23 and 24. The Node Bs 23 and 24 are joined to the RNC 22.

The RNS 15 is also connected to the RNS 22.

The CN 13 comprises a MSC (mobile switching centre) 25 and a SGSN (Serving General Packet Radio Service Support Node) 26. The MSC 25 is connected to the RNSs 15 and 16 whilst the SGSN 26 is connected to the RNSs 15 and 16.

The UMTS system 10 may be in a CELL_FACH (Forward Access Channel) state or a CELL_DCH state. The CELL_FACH state may denote a state of low data transmission in which no dedicated channels are established and only common channels are used. No dedicated radio resources in the Node B 18, 19, 23, or 24 are used. The CELL_DCH may state denote a state of high data transmission and dedicated channels are formed. The UE 11 is assigned dedicated radio and hardware resources, which may minimizes transmission delay and allows for high capacity.

The UE 11 is also known as a mobile terminal. The Node B is similar in function to a radio base station. The Node Bs 18, 19, 23, and 24 act as access points of the UTRAN 12 for the UE 11. Information is transmitted the Nodes Bs 18, 19, 23, and 24 and the UE 11 via radio channels. The radio channels are also known as physical channels. The information is transmitted in an UL (uplink) mode when the information is transmitted from the UE 11 to the Nodes Bs 18, 19, 23, and 24. Similarly, the information is transmitted in a DL (downlink) mode when the information is sent from the Nodes Bs 18, 19, 23, and 24 to the UE 11.

The RNC 17 manages the Node Bs 18, and 19 whilst the RNC 22 manages the Node Bs 23, and 24. The RNCs 17 and 22 are connected to the MSC 25 for a circuit-switched communication, such as a voice call service, and are connected to the SGSN 26 for packet switched communication, such as a wireless Internet service, Voice over IP (VoIP), web-browsing, or e-mail.

A RNC that is in charge of a direct management of the Node B is called a Controlling RNC (CRNC). The CRNC manages common radio resources. On the other hand, a RNC that manages dedicated radio resources for a specific UE is called a Serving RNC (SRNC). The CRNC and the SRNC can be co-located in a same physical node. However, if the specific UE has been moved to an area of a new RNC that is different from the current SRNC, the specific UE may be connected a CRNC and a SRNC that are be located at physically different places.

FIG. 2 illustrates a protocol layer structure 30 of the UMTS system 10 of FIG. 1. The protocol layer structure 30 is provided in the UE 11 of FIG. 1 and in the UTRAN 12 of FIG. 1.

The protocol layer structure 30 includes a RLC (Radio Link Control) layer 31, a MAC (Medium Access Control) layer 32, and a PHY (physical) layer 33. The RLC layer 31 is placed above the MAC layer 32 whilst the MAC layer 32 is provided above the PHY layer 33. A PDCP (Packet Data Convergence Protocol) layer, which is not shown in the FIG. 2, is positioned over the RLC layer.

The RLC layer 31 is connected to the MAC layer 32 by a plurality of logical channels whilst the MAC layer 32 is connected to the PHY layer 33 by a plurality of transport channels 36.

The RLC layer 31 includes a plurality of RLC entities 34. The logical channels 35 may include control channels and traffic channels. The control channels and traffic channels are not shown in the FIG. 2.

The MAC layer 32 comprises sub-layer such as, a MAC-c sub-layer, a MAC-d sub-layer, a MAC-es sub-layer, a MAC-e sub-layer, and a MAC-hs sub-layer. The transport channels 36 may comprise dedicated transport channels, and common transport channels. The MAC-es sub-layer may be provided in a SRNC whilst the MAC-e sub-layer may be located in a Node B.

The PDCP layer efficiently transmits data of network protocols, such as IPv4 (Internet Protocol, version 4.0) or IPv6 (Internet Protocol, version 6.0).

The RLC entity 34 provides data transfer service between a higher layer and the MAC 32. The data transfer service may operate in a transparent mode (TM), an unacknowledged mode (UM), or an acknowledged mode (AM). For packet switched mode, the data transfer service operates only in the UM and in the AM, and not in the TM. The RLC entity 34 offers ciphering in the unacknowledged mode (UM) and in the acknowledged mode (AM).

The logical channels 35 are characterized by the kind of information carried by the logical channels 35. The control channels are for transmission of control plane information whilst the traffic channels are for transmission of user plane information.

The MAC layer 32 provides unacknowledged data transfer service between the logical channels 35 and the transport channels 36. The sub-layers of MAC layer 32 perform a set of functions that may include mapping the logical channels 35 to the common transport channels and to the dedicated transport channels, multiplexing one or more logical channels 35 onto the transport channel 36, and ciphering or deciphering of data in the transparent mode (TM).

The transport channels 36 offer a passageway for movement of data between the PHY layer 33 and the MAC layer 32. The dedicated channel is allocated to a specific UE 11 whereas the common physical channel is shared by a group of UEs 11.

The PHY layer 33 provides a way to transmit data between an air medium and the MAC layer 32, and execution of soft handover of the UE 11 from one geographical cell or area to another geographical cell of the same network.

The PHY layer 33 transmits data over the air medium through physical channels. The transmission of data is in Frequency Division Duplex (FDD) mode or in Time Division Duplex (TDD) mode. In the TDD mode, the physical channels can be characterized by timeslot whilst in the FDD mode, the physical channels can be characterized by code, frequency and orthogonal signature sequence.

FIG. 3 illustrates AM (acknowledge mode) RLC (radio link control) PDU (protocol data unit) 40, which is transmitted by the RLC layer 31 of FIG. 2. The AM RLC PDU 40 is transmitted in an uplink mode, in which the flow of transmission is from the UE 11 of FIG. 1 towards the UTRAN 12 of FIG. 1.

The AM RLC PDU 40 in the UL mode is similar to an AM RLC PDU 40 in a DL (downlink) mode, which is described in "Radio Link Control (RLC) protocol specification (Release 7)", http://www.3gpp.org/ftp/Specs/html-info/25322.htm.

The AM RLC PDU 40 comprises an AM RLC header 41 and a payload field 42. The AM RLC header 41 includes a D/C (data control) field 44, a SN (sequence number) field 45, a P (polling) field 47 and a HE (header extension) field 48. The length of the D/C field 44, the sequence field 45, the P field 47, and HE field 48 is of sixteen bits long, as shown in the FIG. 3. The payload field 42 includes a complete SDU (service data unit).

The size of the AM RLC PDU 40 is not fix and is flexible. This allows the AM RLC PDU 40 to be responsive to physical layer requirements. This is unlike other protocol which supports only an AM RLC PDU of a fixed size.

Content of the HE field 48 indicates end position of the payload field 42, as described in "Radio Link Control (RLC) protocol specification (Release 6)", http://www.3gpp.org/ftp/Specs/html-info/25322.htm. This is difference from a LI (Length Indicator) field, which shows the length of the payload field 42. The LI field is described in "Radio Link Control (RLC) protocol specification (Release 7)", http://www.3gpp.org/ftp/Specs/html-info/25322.htm. The length of payload 42 is in multiple of eight bits.

FIG. 4 illustrates a first MAC-e header 50 of a PDU, or a MAC-es header 50 of a PDU, for the uplink transport channels of FIG. 2. The MAC-es/e header 50 includes a TSN (transmission sequence number field) field 54 and a SI (segmentation indicator) field 55, which support segmentation. The PDU includes the SDU (service data unit) of FIG. 3.

The first MAC-e/es header 50 includes an F (flag) field 51, a logical channel id field 52, a length field 53, the TSN field 54, and the SI field 55. As shown in the FIG. 4, the length of the F field 51, the logical channel id field 52, the length field 53 is of sixteen bits long. The length of the TSN field 54 and the SI field 55 is of eight bits long.

The uplink transport channels for the first MAC-e/es header 50 include CCCH (common control channel), DCCH (dedicated control channel), and DTCH (dedicated traffic channel).

The content of the first MAC-e/es header 50 may be used in a CELL_FACH state and a CELL_DCH state.

The content of the F field 51 is to indicate the presence or absence of an UE id field in the first MAC-e/es header 50. The value of the content of the F field 51, as provided here, is zero, denoting an absence of the UE id field. The content of the UE id field is for resolving any contention. A contention may occur when there is collision of identities from two or more UEs.

The logical channel id field 52, as provided here, is for storing a logical channel id from which the PDU originates. The value of the logical channel id field 52 is zero if the PDU originates from a CCCH (common control channel) of the UE 11.

The content of the logical channel id field 52 is also utilized by the Node B 18, 19, 23, or 24 of the FIG. 1 to determine a correct frame protocol connection for carrying the PDU to the SRNC (serving RNC). The SRNC can utilize the content of logical channel id 52 to determine a correct reordering queue, a logical channel, and a RLC entity.

The contents of the length field 53 and the SI field 55 are utilized to indicate the size of the payload and information about segmentation, such as complete PDU and last segment.

This information is later used for reassembly. The segmentation may be requested by the physical layer.

The segmentation is needed to fit the payload into a MAC transport block size as allowed by the uplink grant given by the Node B, or given by available transmit power, or by logical channel priorities in which payload from higher priority are inserted first. If multiplexing of logical channels is possible for lower priorities, the remaining space can be used.

The segmentation requires two bits of information to be recorded in the SI field 55. For example, the bits of "00" indicate no segmentation, the bits of "01" indicate any segment, and the bits of "10" indicate the last segment. Based on this information together with a length information, a TSN information, and a TSN of the last complete MAC-SDU information, a receiver can reassemble the MAC-SDU or MAC PDU as soon as all TSN are received.

The contents of the length field 53 and the SI field 55 of a PDU, in the SRNC, are used to reorder and then to reassembly and the PDU to form a RLC PDU.

The content of the TSN field 54 describes a transmission sequence number of the PDU in the UE 11 side. The content of the TSN field 54 is utilized by the RNC 17 or 22 of FIG. 1 to reorder the PDU in the UTRAN 12 side.

The SRNC, when in the CELL_DCH state, utilizes the content of the TSN field for macro diversity to establish UL (uplink) SHO (soft handover) between the Node B 18, 19, 23 or 24 and another Node B 18, 19, 23 or 24. The macro diversity occurs if at least one Node B 18, 19, 23 or 24, receives the PDU.

FIG. 5 illustrates a second MAC-e header 60 of a PDU, or a MAC-es header 60 of a PDU, for the uplink transport channels of FIG. 2. The PDU includes the SDU (service data unit) of FIG. 3

The second MAC-e/es header 60 comprises parts that are similar to the parts of the first MAC-e/es header 50 of FIG. 4. The similar parts of the second MAC-e/es header 60 are denoted with the same part number as the part of the first MAC-e/es header 50 with a prime symbol. The description of the first MAC-e/es header 50 is included here by reference, where appropriate.

The second MAC-e/es header 60 includes an F field 51', a UE id field 61, a logical channel id field 52', a length field 53', a TSN field 54', and a SI' field 55. The length of the F field 51', the UE id field 61, the logical channel id field 52', the length field 53' is of twenty-four bits long. The length of the TSN field 54' and the SI field 55' is of eight bits long.

The value of the content of the F field 51', as provided here, is one, denoting a presence of the UE id field 61.

The content of the UE id field 61 is for resolving any contention. When the UE 11 of FIG. 1 is using an E-RACH (enhanced random access channel), the UE 11 uses the F field 51' to denote the presence status of the UE id field 61 in the second MAC-e header 60.

After the UTRAN 12 has indicated a correct reception of the content of the UE id field 61, the UE 11 stops including the UE id field 61 in the second MAC-e/es header 60. The UTRAN 12 may confirm the correct reception of the content of the UE id field 61 by sending the value of the UE id field 61 back to the UE 11, as confirmation of correct receipt.

The value of the UE id field 61, as provided here, is unique. The UE 11, as provided here, usually assigns a value to the content of the UE id field 60. The content of the UE id field 60 is allocated by the UTRAN 12, when the UE 11 is in a RRC (radio resource connection) connected state, and is not performing a cell, or URA (UTRAN registration area) update procedure due to a cell reselection.

The UE id field 60 is also assigned a random value by the UE 11, when the UE 11 is performing the cell, or the URA update due to the cell reselection or a RRC connection request procedure. As the message is a type of a CCCH message, a permanent UE id or U-RNTI (UTRAN radio network temporary identity) is included in a RNC message. The permanent UE id or the U-RNTI can be used to identify the UE 11. The UTRAN 12 can later allocate a unique id in a first DL (downlink) message back to the UE 11. The unique id is then used in subsequent RACH or enhanced RACH procedures.

FIG. 6 illustrates a simplified protocol architecture 65 for E-DCH (enhanced dedicated channel) in the side of a UE. The FIG. 6 shows parts that are similar to the parts of FIGS. 1 to 5. The similar parts are denoted are with similar names. The description of FIGS. 1 to 5 is included by reference, where appropriate.

The FIG. 6 shows a mapping of DTCH (dedicated traffic channel) and DCCH (dedicated control channel) to E-DCH (enhanced dedicated channel). The simplified protocol architecture 65 includes a left part and a right part. The left part shows a RLC layer 68 and a MAC layer 69. In contrast, the right part shows decompositions of PDUs.

The RLC layer 68 is placed above the MAC layer 32. The MAC layer 69 comprises a MAC-d sub-layer 70, a MAC-c sub-layer 71, and a MAC-es/e sub-layers 72 and 73. The MAC-d sub-layer 70 is provided above the MAC-c sub-layer 71 whilst the MAC-c sub-layer 71 is located above the MAC-es/e sub-layers 72 and 73.

The RLC layer 68 includes DCCH entity 66 and DTCH entity 67. The MAC-es/e sub-layers 72 and 73 include segmentation entities 75, numbering entities 76, a multiplexing and E-TFC (Transport Format Combination) selection entity 77, and a HARQ (hybrid automatic retransmission) entity 78.

The DCCH entity 66 and the DTCH entity 67 are connected to the segmentation entities 75 whilst the segmentation entities 75 are connected to the numbering entities 76. The numbering entities 76 are connected the multiplexing and E-TFC selection entity 77, which is connected to the HARQ entity 78.

A RLC PDU 80 corresponds to the DCCH entity 66 and the DTCH entity 67. The RLC PDU 80 comprises a header field 81 and a data field 82. A MAC-d PDU 84, which corresponds to the MAC-d sub-layer 70, includes a data field 85. A MAC-es PDU 88 corresponds to the segmentation entity 75 and the numbering entity 76. The MAC-es PDU 88 comprises a MAC es-header and a data field 92. The MAC-es header includes a length field 89, a TSN field 90, and a SI field 91. A MAC-e PDU 94, which corresponds to the multiplexing and E-TFC selection entity 77, includes a MAC-e header, and a data field 97. The MAC-e header comprises a F field 95, a logical channel id field 96.

A method of transmission through the E-DCH at the UE side comprises the step of receiving a plurality of SDUs (service data units) from a higher layer by the RLC layer 31.

The RLC layer 31 segments or concatenates the SDUs, based on physical layer requirements. Headers are added to the SDUs to form the RLC PDUs 80. The RLC PDUs 80 may be delivered to the MAC-d sub-layer 70 via the DCCH entity 66 and DTCH entity 67 in acknowledgement mode.

The MAC-d sub-layer 70 receives the RLC PDUs 80 and sends the MAC-d PDUs 84 to the MAC-es sub-layer 72, without adding MAC-d headers to the MAC-d PDUs 84. The MAC-d PDUs 84 includes the RLC PDUs 80.

The MAC-es sub-layer 72 receives the MAC-d PDUs 84 and includes the MAC-es headers onto the MAC-d PDUs 84. The segmentation entity 75 then receives the MAC-es PDU 88 and divides the MAC-es PDUs 88 in a manner directed by a PHY layer of the UE. The segmentation entity 75 uses the length field 89 and the SI field 92 of the MAC-es header to record information related to the segmentation, and sends the segmented MAC-es PDU 88 to the numbering entity 76.

The numbering entity 76 later receives the segmented MAC-es PDU 88 and records the transmission sequence number of the MAC-es PDU 88 onto the TSN field 90.

The multiplexing and E-TFC selection entity 77 of the MAC-e sub-layer 73 afterward receives the numbered MAC-es PDUs 88 and adds the MAC-e headers onto the MAC-es PDUs 88 to form the MAC-e PDUs 94. The multiplexing and E-TFC selection entity 77 records the logical channel id from which the MAC-es PDU 88 originates onto the logical channel id field 96.

The multiplexing and E-TFC selection entity 77 then multiplexes the MAC-e PDUs 94 into an order as directed by information received from the UTRAN side of the E-DCH. The multiplexed MAC-e PDU 94 is later sent to the HARQ entity 78.

The HARQ entity 78 obtains the MAC-e PDU 94 from the MAC-e sub-layer 73, stores the MAC-e PDU 94, transmits the MAC-e PDU 94 to the PHY layer of the UE, and re-transmits any lost or corrupted MAC-e PDU 94 depending on HARQ ACK or NACK information form the Node B(s).

In a broad sense, a UE id setting entity can be provided between the HARQ entity 78 and the multiplexing and E-TFC selection entity 77. The UE id setting entity includes an UE id information onto the MAC-e PDU 94 to resolve contention and indicates the presence of the UE id information in the F field 95.

FIG. 7 illustrates a simplified protocol architecture for E-DCH (enhanced dedicated channel) in the side of a UTRAN. The FIG. 7 shows parts that are similar to the parts of FIGS. 1 to 6. The similar parts are denoted are with similar names. The description of FIGS. 1 to 6 is included by reference, where appropriate.

The FIG. 7 shows a mapping of DTCHs and DCCHs to E-DCH on the UTRAN side. The simplified protocol architecture 100 comprises a left part and a right part. The left part shows a RLC layer 104 and a MAC layer 105. In contrast, the right part shows decompositions of PDUs.

The RLC layer 104 is located above the MAC layer 105. The MAC layer 105 comprises a MAC-d sub-layer 106, a MAC-c sub-layer 107, a MAC-es sub-layer 108, and a MAC-e sub-layer 109. The MAC-d sub-layer 106 is provided above the MAC-c sub-layer 107 whereas the MAC-c sub-layer 107 is located above the MAC-es sub-layer 108. The MAC-es sub-layer 108 is provided above the MAC-e sub-layer 109.

The RLC layer 104 comprises DCCH entities 101 and DTCH entities 102. The MAC-es sub-layer 108 comprises reassembly entities 112, reordering entities 113, and reordering queue distribution entities 114. The MAC-e sub-layer 109 includes a de-multiplexing entity 116 and a HARQ entity 117.

The DCCH entities 101 and the DTCH entities 102 are connected to the reassembly entities 112 whilst the reassembly entities 112 are connected to the reordering entities 113. The reordering entities 113 are connected the reordering queue distribution entity 114. The reordering queue distribution entity 114 is connected to the de-multiplexing entity 116, which is connected to the HARQ entity 117.

A RLC PDU 120 corresponds to the DCCH entities 101 and the DTCH entities 102. The RLC PDU 120 comprises a header field 121 and a data field 122. A MAC-d PDU 124, which corresponds to the MAC-d sub-layer 106, includes a data field 125. A first MAC-es PDU 126 corresponds to the reassembly entities 112 and the reordering entities 113. The first MAC-es PDU 126 includes a first MAC es-header and a data field 130. The first MAC-es header includes a length field 127, a TSN field 128, and a SI field 129. A second MAC-es PDU 132, which corresponds to the reordering queue distribution entity 114, includes a second MAC-e header, and a data field 135. The second MAC-e header comprises a F field 133, a logical channel id field 134. A MAC-e PDU 138 corresponds to the de-multiplex entity 116 and the HARQ entity 117. The MAC-e PDU 138 comprises a MAC-e header and a data field 141. The MAC-e header includes a F field 139 and the logical channel id field 140.

A method of transmission at the UTRAN side of the E-DCH comprises the step of the HARQ entity 117 receiving the MAC-e PDUs 138 from the HARQ 78 of FIG. 6. The HARQ entity 117 checks for validity and sends an ACK or NACK to the UE. The HARQ entity 117 sends the MAC-e PDUs 138 to the de-multiplex entity 116.

The de-multiplex entity 116 receives the MAC-e PDU 138 from the HARQ entity 117 and send the MAC-e PDU 138 to the reordering queue distribution entity 114 by an appropriate Iub (interface between a RNC and a Node B) flow base on logical channel id information in the logical channel id field 139 of the MAC-e PDU 138. Information retaining to network configuration and transport QOS (Quality Of Service) may also be used to select the reordering queue distribution entity 114.

The reordering queue distribution entity 114 receives the de-multiplexed MAC-e PDU 138 in the form of the second MAC-es PDU 132, and sends the second MAC-es PDU 132 to the appropriate queue.

The appropriate reordering entity 113 receives the second MAC-es PDU 132 and removes the F field 133 and the logical channel id 134 to form first MAC-es PDU 126. The reordering entity 113 reorders the first MAC-es PDU 126 base on the information in the TSN field 128 of the first MAC-es PDU 126. The TSN field 128 is removed from the MAC-es PDU 126.

The reassembly entity 112 then reassembly the reordered first MAC-es PDU 126 based on data in the length field 127 and the SI field 129 of the first MAC-es PDU. The length field 127 and the SI field 129 are removed from the reassembled first MAC-es PDU 126 to form the MAC-d PDU 124.

The reassembly entity 112 later sends the MAC-d PDU 124 to the MAC-d sub-layer 106. The MAC-d sub-layer 106 later transmit the MAC-d PDU 124 in the form of the RLC PDU 120 the RLC layer 104.

The embodiments of FIGS. 6 and 7 illustrate an E-DCH type of transmission that can be used in the CELL_FACH state and in an uplink HARQ.

FIG. 8 illustrates a simplified protocol architecture 145 for E-RACH (enhanced random access channel) in the side of a UE. The FIG. 8 shows parts that are similar to the parts of FIG. 6. The similar parts are denoted are with similar names. The description of FIG. 6 is included by reference, where appropriate.

FIG. 8 illustrates a mapping of CCCH and DCCHs onto the E-RACH. The simplified protocol architecture 145 includes a left part and a right part. The left part shows a RLC layer 150 and a MAC layer 151 whilst the right part shows decompositions of PDUs.

The RLC layer 150 is placed above the MAC layer 151. The MAC layer 151 comprises a MAC-d sub-layer 154, a MAC-c sub-layer 155, and a MAC-es/e sub-layers 156 and 157. The MAC-d sub-layer 154 is provided above the MAC-c sub-layer 155 whilst the MAC-c sub-layer 155 is located above the MAC-es/e sub-layers 156 and 157.

An important aspect is to place the MAC-c between MAC-es and MAC-d such that the operation in E-RACH mode and E-DCH mode are harmonized.

The RLC layer 150 comprises a CCCH entity 146, a DCCH entity 147, and a DCCH entity 148. The MAC-es/e sub-layers 156 and 157 include segmentation entities 160, numbering entities 161, a multiplexing and E-TFC (Transport Format Combination) selection entity 162, a UE id setting entity 163, and a HARQ (hybrid automatic retransmission) entity 164.

The DCCH entity 147 and the DTCH entity 148 are connected to the segmentation entities 160. The segmentation entities 160 are connected to the numbering entities 161 and the CCCH entity 146 is connected to the numbering entity 161. The numbering entities 161 are connected the multiplexing and E-TFC selection entity 162, which is connected to UE id setting entity 163. The UE id setting entity 163 is connected to the HARQ entity 164.

A RLC PDU 166 corresponds to the CCCH entity 146. The RLC PDU 166 comprises a header field 167 and a data field 168.

A MAC-d PDU 170, which corresponds to the MAC-d sub-layer 154, includes a data field 171. A MAC-c PDU 172 corresponds to the MAC-c sub-layer 155. The MAC-c PDU 172 includes a data field 171.

A MAC-es PDU 174 corresponds to the segmentation entity 75 and the numbering entity 76. The MAC-es PDU 174 comprises a MAC es-header and a data field 175. The MAC-es header includes a length field 176, a TSN field 177, and a SI field 178.

A first MAC-e PDU 180, which corresponds to the multiplexing and E-TFC selection entity 162, includes a first MAC-e header, and a data field 181. The MAC-e header comprises an F field 182, a logical channel id field 183.

A second MAC-e PDU 185 corresponds to UE id setting entity 163. The second MAC-e PDU 185 includes a second MAC-e header and a data field 186. The second MAC-e header comprises an F field 187 and a logical channel id field 188.

A third MAC-e PDU 190, which corresponds to the UE id setting entity 163, includes a third MAC-e PDU header and a data field 191. The third MAC-e PDU header comprises an F field 192, a UE id field 193, and a logical channel id field 194.

A method of transmission through the E-RACH at the UE side comprises the step of the RLC layer 150 receiving a plurality of SDUs (service data units) from a UE via a higher layer. Headers are added to the SDUs to form the RLC PDUs 166.

The RLC PDUs 166 may be delivered to the MAC-d sub-layer 154 via the DCCH entity 147 and DCCH entity 148 and to the MAC-c sub-layer 155 via the CCCH entity 146. The DCCH entity are usually used when there is high level of PDUs transmission and the CCCH entity is utilized when there is a low level of PDUs transmission.

The MAC-c sub-layer 155 receives the RLC PDUs 160 from the CCCH entity 146 and transmits the MAC-c PDUs 172 to the numbering entity 161 of the MAC-es sub-layer 156 without any segmentation of the MAC-c PDUs 172.

The MAC-d sub-layer 154 receives the RLC PDUs 160 from the DCCH entities 147 and 148, and sends the MAC-d PDUs 170 to the segmentation entities 160 of the MAC-es sub-layer 156, without adding any headers to the MAC-d PDUs 170. The MAC-d PDUs 170 includes the RLC PDUs 166.

The MAC-es sub-layer 156 adds the MAC-es headers onto the MAC-c PDUs 172 and onto the MAC-d PDUs 170 to form the first MAC-e PDUs 174.

The segmentation entity 160 divides the MAC-d PDUs 170, as directed by a PHY layer of the UE. The segmentation entity 160 records information regarding the segmentation onto the length fields 176 and the SI fields 178 of the MAC-es headers of the segmented first MAC-e PDUs 174.

The numbering entity 161 then records the transmission sequence number onto the TSN field 177 of the first MAC-e PDUs 174 and records the logical id of the first MAC-e PDUs 174 onto the logical channel id field 183. If the first MAC-e PDU 174 originates from the CCCH entity 146, the content of the logical channel id 183 is set to zero.

The multiplexing and E-TFC selection entity 162 later adds the second MAC-e headers onto to the first MAC-e PDUs 174 to form the second MAC-e PDUs 180 and records the logical channel id information of the first MAC-e PDUs 174 onto the logical channel id fields 183.

The multiplexing and E-TFC selection entity 162 multiplex the second MAC-e PDUs 180 as directed by information received from a UTRAN side of the E-RACH.

The UE id setting entity 163 afterwards add UE id information onto the third MAC-e headers of the third MAC-e PDUs 190 to resolve contention and indicate the presence status of the UE id information in the F field 192.

The UE id information is removed from the third MAC-e header, as shown in the second MAC-e PDU 185, when the UTRAN side of the E-RACH feedback a correct reception of the content of the UE id field 193. The UTRAN can confirm the correct reception of the content of the UE id field 193 by feeding back the content of the UE id field 193 back to the UE side of the E-RACH. The F field 187 of the second MAC-e PDU 185 is updated to reflect the absence status of the UE id field 193.

The HARQ entity 164 receives the second MAC-e PDUs 185 or the third MAC-e PDUs 190, stores the second MAC-e PDUs 185 or the third MAC-e PDUs 190. The HARQ entity 164 later sends the second MAC-e PDUs 185 or the third MAC-e PDUs 190 to the PHY layer of the UE, and re-transmits any lost or corrupted PDU.

In a generic sense, the MAC-c sub-layer 155 may evaluate the UE id of the RLC PDU 160 from the CCCH entity 146 with respect to assigning the data. The MAC-c sub-layer 155 may send the RLC PDU 160 to the segmentation entity 160 and not bypass the segmentation entity 160.

FIG. 9 illustrates a simplified protocol architecture 200 for E-RACH in the side of a UTRAN. The FIG. 9 shows parts that are similar to the parts of FIG. 7. The similar parts are denoted are with similar names. The description of FIG. 7 is included by reference, where appropriate.

The FIG. 9 shows a mapping of CCCH, DCCHs and DCTH to E-RACH on the UTRAN side of the E-RACH. The simplified protocol architecture 200 comprises a left part and a right part. The left part shows a RLC layer 201 and a MAC layer 202. In contrast, the right part shows decompositions of PDUs.

The RLC layer 201 is located above the MAC layer 202. The MAC layer 202 comprises a MAC-d sub-layer 204, a MAC-c sub-layer 205, a MAC-es sub-layer 206, and a MAC-e sub-layer 207. The MAC-d sub-layer 204 is provided above the MAC-c sub-layer 205 whereas the MAC-c sub-layer 205 is located above the MAC-es sub-layer 206. The MAC-es sub-layer 206 is provided above the MAC-e sub-layer 207.

An important aspect is to place the MAC-c between MAC-es and MAC-d such that the operation in E-RACH mode and E-DCH mode are harmonized.

The RLC layer 204 comprises CCCH entity 210, DCCH entities 211, and DTCH entities 212. The MAC-es sub-layer 108 comprises reassembly entities 215, reordering entities 216, reordering queue distribution entities 217, and UE de-multiplexing and separation of CCCH entity 218. The MAC-e sub-layer 109 includes a de-multiplexing entity 219 and HARQ entities 220.

The DCCH entities 211 and the DTCH entities 211 are connected to the reassembly entities 215 whilst the reassembly entities 215 are connected to the reordering entities 216, which are in turn connected to the reordering queue distribution entities 217. The CCCH entity 210 is connected to the reordering entity 216, which is in turn connected to the UE de-multiplexing and separation of CCCH entity 218.

The UE de-multiplexing and separation of CCCH entity 218 is connected to the de-multiplexing entity 219 via one or more Iub flows. The number of Iub flow is dependent on NW (network) configuration. The UTRAN may separate a SRB (signal radio bearer) and from a RB (radio bearer) for different transport QOS.

The de-multiplexing entity 219 is connected to HARQ entities 220. The number of HARQ entities 220 connected to the de-multiplexing entity 219 is dependent on the number of UE simultaneously accessing the E-RACH.

As shown in the FIG. 9, a RLC PDU 222 corresponds to the RLC layer 201. The RLC PDU 222 comprises a header field 223 and a data field 224. A MAC-d PDU 226, which corresponds to the MAC-d sub-layer 204, includes a data field 227. A MAC-c PDU 228 corresponds to the MAC-c sub-layer 205. The MAC-c PDU 228 includes a data field 229. A first MAC-es PDU 230 corresponds to the reassembly entities 215 and the reordering entities 216. The first MAC-es PDU 230 includes a first MAC es-header and a data field 231. The first MAC-es header includes a length field 232, a TSN field 233, and a SI field 234. A second MAC-es PDU 236, which corresponds to the reordering queue distribution entity 217, includes a second MAC-e header, and a data field 237. The second MAC-e header comprises an F field 238, a logical channel id field 239. A first MAC-e PDU 240 and a second MAC-e PDU 250 correspond to the de-multiplex entity 219 and the HARQ entities 220. The first MAC-e PDU 240 comprises a first MAC-e header and a data field 241. The first MAC-e header includes a F field 242 and the logical channel id field 243. The second MAC-e PDU 250 comprises a second MAC-e header and a data field 251. The second MAC-e header includes a F field 252, a UE id field 253, and the logical channel id field 254.

A method of an uplink transmission at the UTRAN side of the E-RACH comprises the step of receiving the first MAC-e PDUs 240 or the second MAC-e PDUs 250 from the HARQ 164 of the UE side of FIG. 8, by the HARQ entity 220. The HARQ entity 220 then sends the first MAC-e PDUs 240 or the second MAC-e PDUs 250 to the de-multiplex entity 219 and indicates delivery status of the first MAC-e PDUs 240 or of the second MAC-e PDUs 250 to the HARQ 164.

The de-multiplex entity 219 then sends the received first MAC-e PDUs 240 or the received second MAC-e PDUs 250 to the UE de-multiplexing and separation CCCH 218 via one or more Iub flows depending on network configuration.

The UE de-multiplexing and separation CCCH 218 assigns the received first MAC-e PDUs 240 or the received second MAC-e PDUs 250 to the appropriate reordering queue distribution entity 217 based on the information in the logical channel id field 243 or 254. The UE de-multiplexing and separation CCCH 218 also removes the F field 238 and the logical channel id field 239 from the second MAC-es PDU 236 to form the first MAC-es PDU 230 and sends the first MAC-es PDU 230 to the reordering entities 216.

If the content of the logical channel id is zero, the MAC-e PDU 240 is sent to the reordering entity 216 for transmission to the CCCH entity 210 or directly to the CCCH entity 210.

The reordering entity 216 reorders the first MAC-es PDU 230 based on the information in the TSN field 233 of the first MAC-es PDU 230 and then sends the reordered first MAC-es PDU 230 to the reassembly entity 215.

The reassembly entity 215 then reassembly the reordered first MAC-es PDU 230 based on data in the length field 232 and the SI field 234 of the first MAC-es PDU 230. The length field 232, the SI field 234, and the TSN field 233 are removed from the reassembled first MAC-es PDU 230. The reassembly entity 215 later sends the MAC-d PDU 226 to the RLC layer 201 via the MAC-d sub-layer 204, or the MAC-c PDU 228 to the RLC layer 201 via the MAC-c sub-layer 205.

The embodiments of FIGS. 8 and 9 illustrate a E-DCH type of transmission in CELL_FACH state, in random access procedure, and in uplink HARQ. The embodiments are a natural counter-part to DL HSDPA (High Speed Downlink Packet Access) operation in CELL_FACH state since the header structure of the embodiments is very similar to header structure introduced for HSDPA, release 7.

Figure 10:
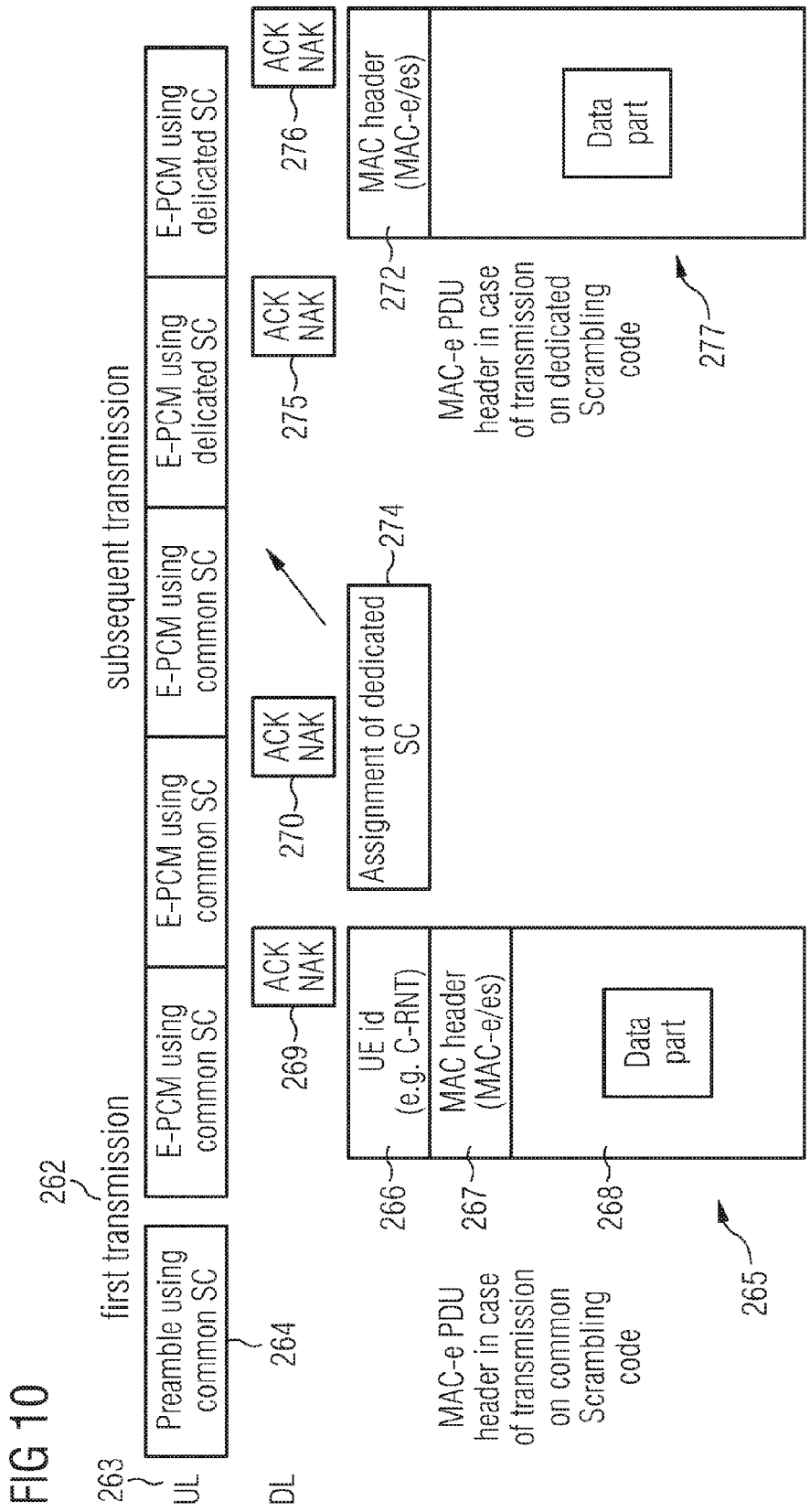
FIG. 10 illustrates a transmission of messages using E-RACH procedure over E-DCH (E-DPCCH/E-DPDCH) like physical channels of the E-RACH of FIGS. 8 and 9.

FIG. 10 shows a method of transmitting data between an UE (user equipment) and a Node B of an UMTS type system of FIG. 1 in which an UE ID can be omitted. The transmission is over an E-DCH (enhanced dedicated channel) whilst the UE stays in a same cell of the Node B.

The method comprises a first mode of transmission and a second mode of transmission. The UE transmits to the Node B a message with UE ID in the first mode of transmission whilst the UE transmits to the Node B a message omitting the UE ID in the second mode of transmission.

In the first mode of transmission, the UE sends to the Node B a first transmission 262 on a UL (uplink) 23. The first transmission 262 includes a preamble 264 and a first uplink message 265. The preamble 264 and the first uplink message 265 are scrambled with a common scrambling code. The first uplink message 265 includes a first UE id 266, a MAC header 267, and a data part 268. The first UE id 266 can be in a form of a C-RNTI (Radio Network Temporary Identity). The MAC header 267 includes an F field that includes the presence status of the first UE id 266 in the first uplink message 265. The first uplink message 265 has a length that is equal to a (TTI) Transmission Time Interval of the E-DCH transport channel.

The Node B later receives the first uplink message 265 and sends an ACK (acknowledgement) data packet 269 to the UE to indicate receipt of the first uplink message 265. The Node B determines the presence status of the UE ID from the F field of the first uplink message 265.

The Node B or another part of an UTRAN later allocates a second UE ID to the UE. The allocation of the second UE ID can also be performed by a RNC (radio network controller) of the UTRAN. The second UE ID can be randomly chosen. The Node B determines the presence status of the UE ID from the F field of the first uplink message 265.

The Node B then uses downlink (DL) to allocate F-DPCH (Fractional Dedicated Physical Channel) resources together and echoes the first UE ID 266 that was received from the first uplink message 265 back to the UE. The allocation of F-DPCH resources can occur before or after the echoing the first UE id 266 after first transmission 262.

The UTRAN then changes to the second mode of transmission in which the Node B later assigns 274 the UE with a dedicated scrambling code and sends the dedicated scrambling code to the UE. The scrambling code is dedicated in the sense that the scrambling code is unique within the cell the UE is attached to. The other UEs within the cell do not have scrambling codes that is the same as the dedicated scrambling code. The Node B also stores a mapping between the second UE ID and the dedicated scrambling code or between the first UE ID and the dedicated scrambling code.

The UE then receives the dedicated scrambling code and echoes the correct first UE id 266 with an ACK data packet 270 to the Node B. The UE ID is later omitted from the MAC header 272 in transmission 273 of subsequent messages 277 from the UE and the subsequent messages 277 are then scrambled with the dedicated scrambling code.

The Node B afterward receives subsequent messages 277 with the dedicated scrambling code from the UE and later determines which UE sends the subsequent messages 277 by determining which UE the dedicated scrambling code is mapped to.

The Node B may later include the second UE ID into a FP (frame protocol) of the data part or of a header when transmitting the PDU to the RNC.

In another words, the UE uses a common scrambling code and makes HARQ retransmission with the common scrambling code until the UE is allocated with the dedicated code. As the retransmissions are done with the HARQ, the MAC PDU and the MAC PDU retransmitted by the HARQ are similar.

If UE makes a completely new E-DCH or E-RACH access, such as cell reselection in that no dedicated scrambling code has been assigned, the UE selects the first mode of transmission in which it requests for a new dedicated scrambling code by transmitting an E-DCH or RACH preamble as in a normal access. The preamble specific common scrambling code is used for the message part and the UE ID is included into message part.

The ACK data packets, as provided here, are for confirmation of receipt of data packets.

In an example where a plurality of UE is attached to the UTRAN, each UE is assigned a unique dedicated scrambling code by the UTRAN and the UTRAN maps the unique dedicated scrambling code to an ID of each UE. The UE transmits to the UTRAN messages that are scramble with the unique dedicated scrambling code.

In a generic sense, the transmission can be over an E-DCH, an E-RACH or a physical channel that is similar the E-DCH. The transmission of ACK data packet can be replaced by a Fast retransmission of packets or another way to acknowledge the receipt of data packets. The UE id can be in a MAC header of a MAC layer. The UE ID can be omitted from a MAC header of MAC layer in transmission of subsequent messages from the UE.

In summary, the method of omitting UE id in transmission between an UE and a Node B comprises the step of sending an UE id by an UE in an uplink channel for an E-RACH or E-DCH procedure for contention resolution. The Node B assigns a resource to the UE. The resource can be a dedicated scrambling code. The UE later stops adding the UE id in every E-RACH TTI (transmission timing interval) on a MAC header and the UE transmits data with the dedicated scrambling code. The Node B receives the data with the dedicated scrambling code and maps the data to the previously received UE id and thus resolving contention.

If the UE is performing cell update or the UE is performing URA update due to cell reselection or due to RRC Connection request procedure, the UE initiates the process to omit UE id by starting a new E-RACH procedure in the new cell and includes its UE id in an E-RACH message for initial TTIs to resolve contention.

The FLAG and UE id fields can be used in CELL_FACH and CELL_DCH state wherein the flag field indicates the presence status of the UE id in the MAC-e header. When UE is performing random access, the UE uses the flag field to indicate the presence of the UE id in the MAC-e header. The UE id is used to solve contention.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

What is claimed is:

1. A method of an uplink transfer from a user equipment to a radio network over a wireless interface in a wireless communications system, the method comprising:
    performing a first mode of transfer comprising sending a first message from the user equipment to a Node B of the wireless communication system; and
    performing a second mode of transfer comprising:
        receiving a resource by the user equipment from the Node B; and
        sending a subsequent message from the user equipment to the Node B, the subsequent message omitting a user equipment identifier in a MAC layer, wherein
    the first message comprises a UE identifier in a MAC layer, the resource comprises a dedicated scrambling code, and the at least one subsequent message is scrambled with the dedicated scrambling code.

2. The method according to claim 1, wherein the Medium Access Control (MAC) layer comprises a MAC-d sub-layer, a MAC-c sub-layer, and a MAC-es sub-layer with the MAC-c sub-layer being provided between the MAC-d sub-layer and the MAC-es sub-layer.

3. The method according to claim 1, wherein the first message includes the user equipment id in a MAC layer.

4. The method according to claim 2, wherein the first message comprises a user equipment id status field, which indicates presence of the user equipment id.

5. A method of an uplink transfer from a user equipment to a radio network over a wireless interface in a wireless communications system, the method comprising:
    performing a first mode of transfer comprising:
        receiving a first message at a Node B of the wireless communication system from the user equipment; and
        assigning a resource to the user equipment by the Node B; and
    performing a second mode of transfer comprising receiving a subsequent message at the Node B from the user equipment, the subsequent message omitting a user equipment identifier in a MAC layer, wherein the first message comprises a UE identifier in a MAC layer, the resource comprises a dedicated scrambling code, and the at least one subsequent message is scrambled with the dedicated scrambling code.

6. The method according to claim 5, wherein the first mode of transfer further comprises mapping the dedicated scrambling code to the user equipment id by the Node B or another part of a UMTS terrestrial radio access network (UTRAN) of the wireless communications system.

7. The method according to claim 6, wherein the second mode of transfer further comprises determining the user equipment id by mapping the dedicated scrambling code to the UE id.

8. The method according to claim 5, wherein the Medium Access Control (MAC) layer comprises a MAC-d sub-layer, a MAC-c sub-layer, and a MAC-es sub-layer with the MAC-c sub-layer being provided between the MAC-d sub-layer and the MAC-es sub-layer.

9. The method according to claim 5, wherein the first mode of transfer further comprises determining a status of the user equipment id in the first message from a user equipment id status field in the first message.

10. A user equipment of a wireless communications system to perform an uplink transfer over a wireless interface to a radio network, the user equipment comprising:
 a medium access control layer;
 a first transfer unit to transmit a first message to a Node B of the wireless communications system; and
 a second transfer unit to transmit a subsequent message to the Node B, the subsequent message omitting a user equipment identifier in the medium access control layer, but using a resource assigned by the Node B, wherein the resource comprises a dedicated scrambling code, the subsequent message is scrambled with the dedicated scrambling code, and the first message comprises a user equipment identifier.

11. The user equipment according to claim 10, wherein the subsequent message is scrambled with the dedicated scrambling code by the second transfer unit.

12. The user equipment according to claim 11, wherein the medium access control layer comprises
 a MAC-d sub-layer,
 a MAC-c sub-layer, and
 a MAC-es sub-layer with the MAC-c sub-layer being provided between the MAC-d sub-layer and the MAC-es sub-layer.

13. The user equipment according to claim 10, wherein the first message further comprises a user equipment id status field, which indicates presence of the user equipment id.

14. A Node B of a radio network of a wireless communications system to receive an uplink transfer over a wireless interface from a user equipment, the Node B comprising:
 a first transfer unit to receive a first message from the user equipment and assign a resource to the user equipment; and
 a second transfer unit to receive a subsequent message from the user equipment, the subsequent message omitting a user equipment id in a MAC layer, wherein the resource comprises a dedicated scrambling code and the subsequent message is scrambled with the dedicated scrambling code.

15. The Node B according to claim 14, wherein the first transfer unit maps the dedicated scrambling code to the user equipment id.

16. The Node B according to claim 15, wherein the second transfer unit determines the user equipment id by mapping the dedicated scrambling code to the user equipment id.

17. The Node B according to claim 14, wherein the medium access control layer comprises:
 a MAC-d sub-layer,
 a MAC-c sub-layer, and
 a MAC-es sub-layer with the MAC-c sub-layer being provided between the MAC-d sub-layer and the MAC-es sub-layer.

18. The Node B according to claim 14, wherein the first message comprises a user equipment id status field.

* * * * *